United States Patent [19]

Buma

[11] Patent Number: 4,659,070

[45] Date of Patent: Apr. 21, 1987

[54] AIR SUSPENSION

[75] Inventor: Shuuichi Buma, Aichi, Japan

[73] Assignee: Toyota Jidosha Kabushiki Kaisha, Japan

[21] Appl. No.: 677,027

[22] Filed: Nov. 30, 1984

[30] Foreign Application Priority Data

Dec. 14, 1983 [JP]  Japan .......................... 58-191487[U]

[51] Int. Cl.⁴ .............................................. F16F 9/08
[52] U.S. Cl. .................................. 267/64.25; 280/707
[58] Field of Search .................... 267/35, 64.24, 64.25; 280/707-712, 714

[56] References Cited

U.S. PATENT DOCUMENTS 2,622,872  12/1952  Wettstein ..................... 267/64.25 X
3,000,625  9/1961  Polhemus ......................... 267/64.24
4,534,580  8/1985  Kobayashi et al. .......... 267/64.24 X Primary Examiner—Duane A. Reger
Attorney, Agent, or Firm—Kane, Dalsimer, Kane, Sullivan and Kurucz

[57] ABSTRACT

An air suspension comprises a first housing fixed to a piston rod of a shock absorber, a diaphragm disposed to form a main air chamber in cooperation with the first housing, of which one end is fixed to the first housing and the other end to a cylinder of the shock absorber through an air piston and a second housing provided to form an auxiliary air chamber outside the main air chamber. Communication between the main and auxiliary air chambers is afforded and shut off by a valve unit operated with a pair of coils.

9 Claims, 2 Drawing Figures

AIR SUSPENSION

BACKGROUND OF THE INVENTION

1. Field of the Invention

This invention relates to an air suspension, and more particularly to a strut type air suspension used for an automobile, which has a variable spring constant.

2. Description of the Prior Art

A strut type air suspension having a variable spring constant comprises a shock absorber and an air spring. The air spring is constituted from a main air chamber formed by mounting a housing on a piston rod of the shock absorber while spanning a diaphragm between the housing and a cylinder of the shock absorber and an auxiliary air chamber formed of a tank, both chambers being filled with compressed air. The air spring can obtain hard spring characteristics when the main air chamber is shut off from the auxiliary air chamber and soft spring characteristics when the main air chamber communicates to the auxiliary air chamber. Thus, the spring characteristics can be changed according to the travelling condition of an automobile to ensure a good ride and controllability.

However, since the tank and a valve unit incorporated in piping interconnecting the tank and the housing to afford and shut off communication between the auxiliary and main air chambers were conventionally provided independently spaced from the housing, spaces were needed for installing respectively the valve unit and the tank so that not only the effective space of a compartment was narrowed, but also the adjustment of spring constant was difficult as the resistance of the piping was increased depending upon the length thereof. Also, since the valve unit was mounted exposed to the outside, the operational noise in operation of the valve unit was transmitted to the compartment to give an unpleasant feeling to passengers.

SUMMARY OF THE INVENTION

Accordingly, an object of the present invention is to provide an air suspension which can reduce the influence upon the effective space of a compartment and eliminate substantially the resistance of the piping.

A further object of the present invention is to provide an air suspension which can restrain the transmission of operational noise of the valve unit to the compartment.

The air suspension according to the present invention comprises a shock absorber, a main air chamber formed to surround the shock absorber, an auxiliary air chamber provided adjacent the outside of the main air chamber or inside the main air chamber to communicate to said main air chamber and released from a spring action when shut off from said main air chamber, a valve unit capable of affording and shutting off communication between said main and auxiliary air chambers and a means for operating the valve unit.

The other objects and features of the present invention will become apparent from the following description of preferred embodiments of the invention with reference to an accompanying drawing.

DESCRIPTION OF THE PREFERRED EMBODIMENT

Figure 1:
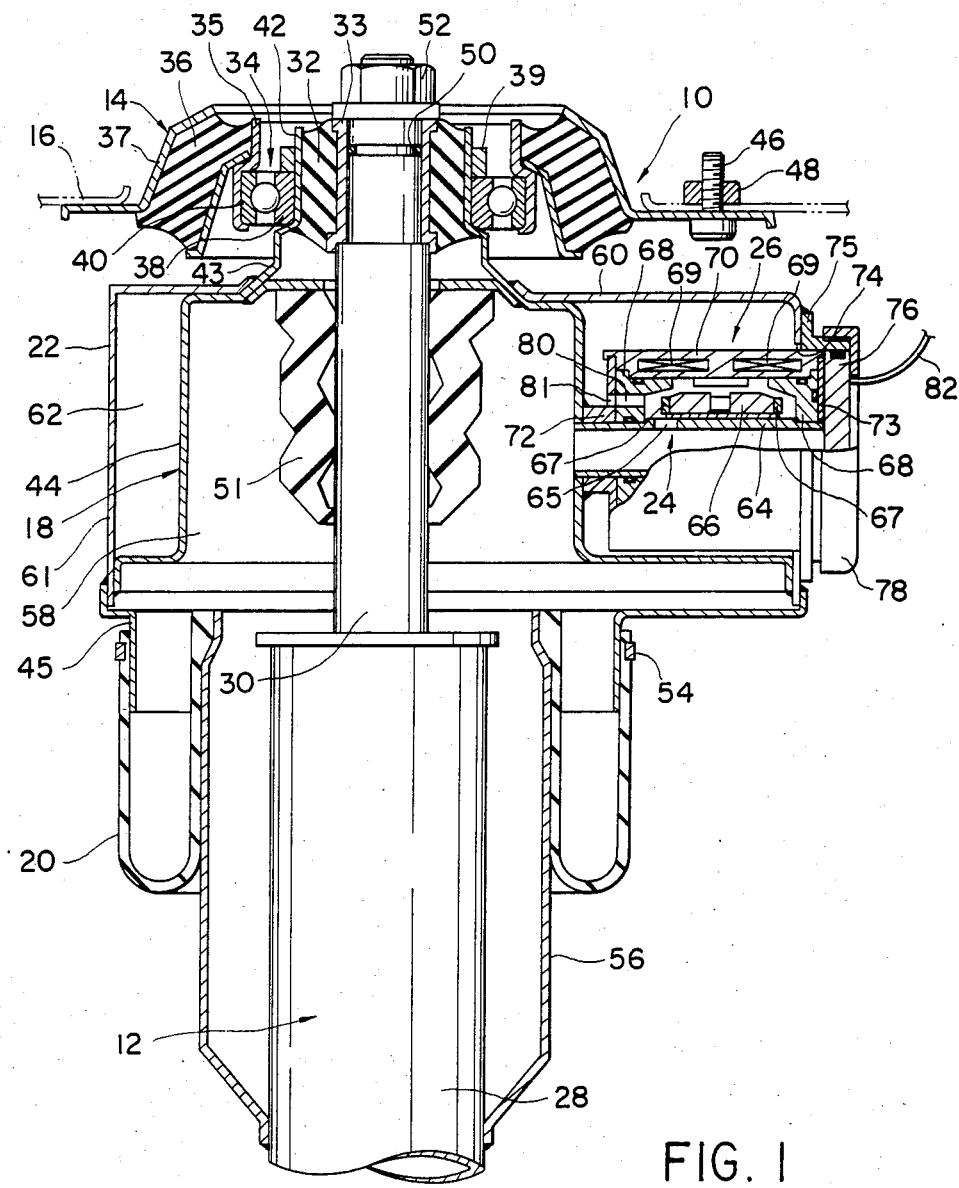
FIG. 1 is a sectional view showing an essential part of an air suspension according to the present invention.
Figure 2:
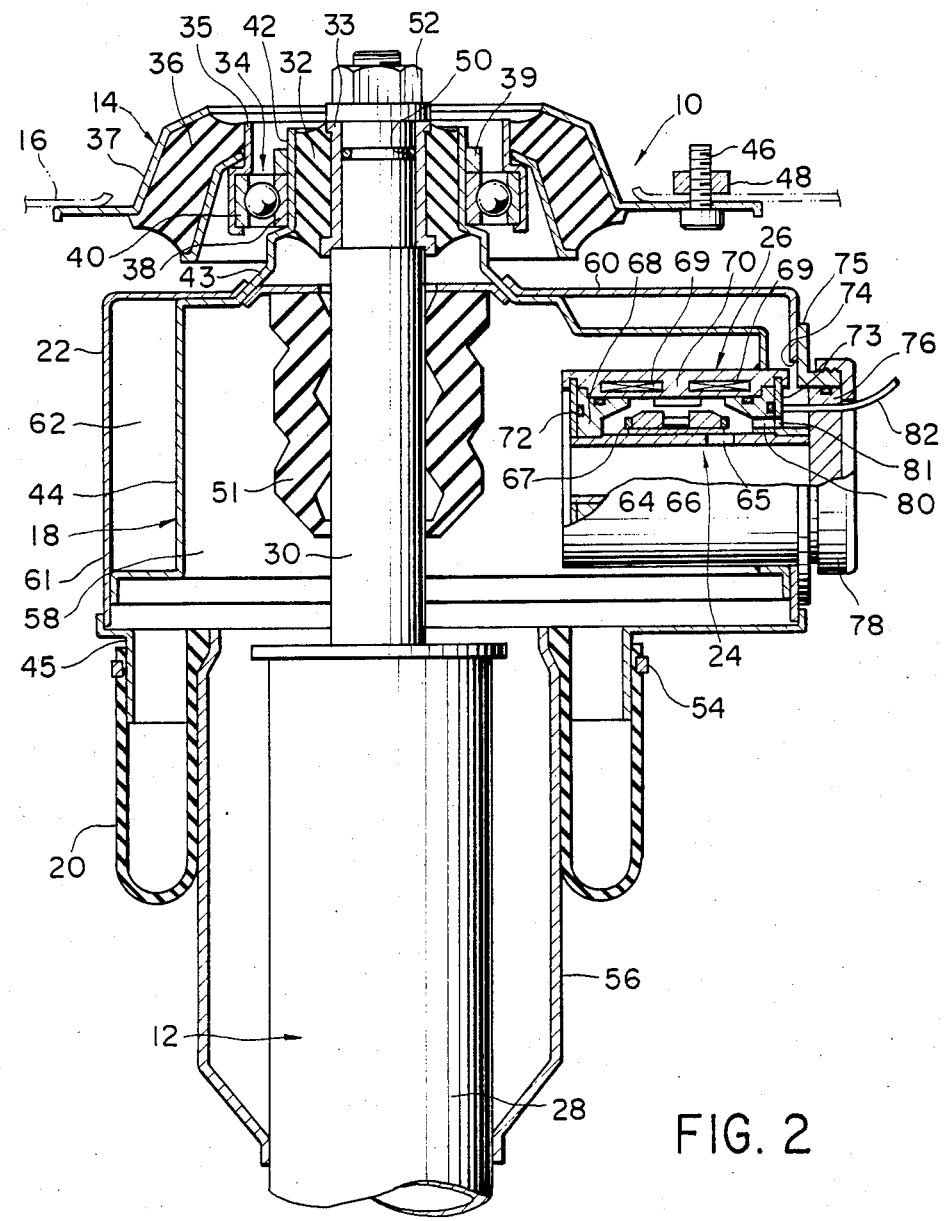
FIG. 2 is a sectional view as in FIG. 1 illustrating the valve unit disposed in the main air chamber.

An air suspension 10 connecting an upper end of a shock absorber 12 to a car body 16 through an upper support 14 comprises a first housing 18, an elastic body 20, a second housing 22, a valve unit 24 and an operating means 26.

The shock absorber 12 is provided with a cylinder 28 and a piston rod 30 connected to a piston slidably arranged in the cylinder 28 and projecting from the cylinder 28 to the outside. The piston is provided with a valve through which oil or other liquid received in the cylinder flows when the piston rod 30 is extended and contracted. Since said constitution is known per se, it is not shown in the drawing. For the shock absorber 12 may be used a so-called mono tube type one consisting of only a single cylinder as well as a so-called twin tube type one provided with an inside shell and an outside cylinder.

The upper support 14 is provided with an inside bushing 32, a bearing 34 and an outside bushing 36. The inside bushing 32 is vulcanized and bonded to a collar 33 and a first cylindrical portion 42 of the first housing 18. Also, the outside bushing 36 is vulcanized and bonded to a holder 35 and a support member 37. The bearing 34 is disposed between the first cylindrical portion 42 of the first housing and the holder 35, and an inner race 38 of the bearing fixed to a shoulder of the first cylindrical portion 42 by a caulking ring 39. An outer race 40 of the bearing is fixed to the holder 35 by caulking the holder 35. The upper support 14 is connected to the car body 16 by screwing a nut 48 on a bolt 46 extending through the support member 37 and the car body 16.

The first housing 18 includes said first cylindrical portion 42, a tapered inclined portion 43 diverging from the cylindrical portion, a second cylindrical portion 44 extending from the tapered portion with the expanded diameter and a third cylindrical portion 45. The piston rod 30 provided with an O-ring 50 extends through the collar 33 of the inside bushing 32 so that a nut 52 is screwed onto the piston rod 30, the inside bushing 32 is fixed to the piston rod 30 and the first housing 18 to the piston rod 30 through the bushing 32. To the tapered inclined portion 43 of the first housing 18 is attached a bound stopper 51.

The elastic body 20 is a diaphragm formed cylindrically of rubber. The elastic body 20 is folded back at the approximately central portion, the outside end thereof is sandwitched between the third cylindrical portion 45 of the first housing 18 and a ring 54 and fixed to the first housing 18 by caulking the ring 54. The inside end of the elastic body 20 is fitted onto a cylindrical air piston 56 welded to the cylinder 28. As a result, a main air chamber 58 is defined by the elastic body 20 in cooperation with the first housing 18.

It is preferable to provide the air piston 56, since the volume of the main air chamber 58 can be enlarged and the elastic body 20 can be prevented from direct contact with the outer peripheral surface of the cylinder 28 to reduce the thermal deterioration of the elastic body 20. However, the air piston 56 may be omitted, wherein the inside end of the elastic body 20 is fixed directly to the cylinder 28. In this specification, the fixation of the elastic body 20 to the cylinder means said both configurations. The elastic body 20 may be made in the form of a bellows.

The second housing 22 includes a ceiling portion 60 and a cylindrical portion 61 extending downward from the ceiling portion. In the embodiment shown in the drawing, the ceiling portion 60 bears against the tapered inclined portion 43 of the first housing 18 under the eccentric condition to be welded to said tapered inclined portion over the whole periphery, and further the cylindrical portion 61 of the second housing 22 is sandwiched between the second and third cylindrical portions 44, 45 of the first housing 18, the cylindrical portions 61, 44 and 61, 45 being respectively welded to each other over the whole periphery to fix the second housing 22 to the first housing 18. As a result, an auxiliary air chamber 62 is defined outside the main air chamber 58 by the first and second housings 18, 22 in cooperation with each other.

The valve unit for affording and shutting off communication between the main and auxiliary air chambers 58, 62 is disposed inside the auxiliary air chamber 62 in the embodiment shown in the drawing, and provided with a cylindrical member 64 and a movable valve body 66. The cylindrical member 64 has a hole 65 radially provided and the inner end fixed to the second cylindrical portion 44 of the first housing 18 to be arranged horizontally. The movable valve body 66 is formed cylindrically of iron and slidably along the cylindrical member 64. A rubber buffer body 67 is mounted on both ends of the movable valve body 66 to restrain the generation of impact sound, when the movable valve body 66 abuts against a fixed iron core as will be later described, and ensure air tightness.

The means 26 for operating the valve unit 24 includes a pair of fixed iron cores 68 and a coil member 70 in which a pair of coils 69 is built. The pair of fixed iron cores 68 is fitted in the cylindrical member 64 of the valve unit axially at an interval and the coil member 70 is fitted in the fixed iron core. Further, end plates 72, 73 are applied against the fixed iron core and an end of the coil member is caulked toward the inner end plate 72 to fix the end plate. A bracket 75 is mounted around a hole 74 provided in the second housing 22, and the coil member 70 is fitted in the bracket 75. An insulating member 76 is applied against the bracket 75 and covered with a cap 78 so that the valve unit 24 and the operating means 26 are fixed to the first and second housings 18, 22. Holes 80, 81 in the inner fixed iron core 68 and the end plate 72 are provided in positions opposed to the buffer body 67 of the movable valve body, and the main air chamber 58 communicates to the auxiliary air chamber 62 through the cylindrical member 64, the hole 65 and further the holes 80, 81 to be shut off from the auxiliary air chamber when the movable valve body 66 closes the hole 80.

Operation of Embodiment

The suspension 10 is mounted on the car body and a power cord 82 is connected to the pair of the coil 69 of the coil member 70 in the operating means 26. To afford communication between the main and auxiliary air chambers 58, 62, a switch incorporated in the power cord 82 is closed to move the movable valve body 66 of the valve unit rightward as viewed in the drawing so that the movable valve body abuts against the outer fixed iron core 68 to be held under such condition. As a result, since the volume of the air chamber is increased, the air spring has soft characteristics of spring. On the contrary, to shut off communication between the main and auxiliary air chambers 58, 62, the switch is changed over to move the movable valve body 66 leftward as viewed in the drawing so that the movable valve body 66 abuts against the inner fixed iron core 68 to be held under such condition. Consequently, the air spring has the volume of only main air chamber to show the hard characteristics of spring.

Another Embodiment

In the above mentioned embodiment, the second housing 22 is mounted outside the first housing 18 to form the auxiliary air chamber outside the main air chamber. Instead of said embodiment, the second housing 22 may be mounted inside the first housing 18 to form the auxiliary air chamber inside the main air chamber. In this case, the second housing may be fixed to the first housing 18, and further the second housing may be formed hollow and fixed to the piston rod 30 so that the auxiliary air chamber is formed by the second housing in cooperation with the piston rod 30.

The valve unit 24 may be disposed in the main air chamber 58. Also, the operating means 26 may be constituted from a hydraulic cylinder.

According to the present invention, since the auxiliary air chamber is formed outside or inside the main air chamber originally provided in the air suspension and the valve unit is disposed inside the main air chamber or auxiliary air chamber, the effective space in the compartment is little narrowed and the resistance of the duct can be substantially eliminated. Also, since the valve unit is covered with the housing, the operational noise in operation of the valve unit can be restrained from transmission to the compartment so that an unpleasant feeling is little given to passengers.

What is claimed is:

1. An air suspension comprising:
    a shock absorber;
    a main air chamber defined by a first housing and a diaphragm to surround the shock absorber;
    an auxiliary air chamber defined by said first housing and a second housing to communicate to said main air chamber and released from a spring action when shut off from the main air chamber;
    a valve unit capable of affording and shutting off communication between said main and auxiliary air chambers, the valve unit being disposed within a region defined by said first and second housings; and
    a means for operating the valve unit compulsorily.

2. An air suspension as claimed in claim 1, wherein said valve unit is disposed in said main air chamber.

3. An air suspension comprising:
    a shock absorber having a cylinder and a piston rod;
    a first housing fixed to said piston rod of the shock absorber;
    an elastic body disposed to form a main air chamber in cooperation with said first housing, one end of the elastic body being fixed to said first housing and the other end to said cylinder;
    a second housing provided to form an auxiliary air chamber adjacent said main air chamber, the auxiliary air chamber being released from a spring action when shut off from the main air chamber;
    a valve unit capable of affording and shutting off communication between said main and auxiliary air chambers; and
    a means for operating the valve unit,
    wherein said valve unit and the operating means are disposed respectively in a space defined by said first and second housings, and the operating means is operated from outside the space.

4. An air suspension as claimed in claim 3, wherein said elastic body is fixed to said cylinder through an air piston.

5. An air suspension as claimed in claim 3, wherein said space is said auxiliary air chamber.

6. An air suspension as claimed in claim 5, wherein said valve unit has a cylindrical member and a valve body formed of a a magnetic material capable of moving along said cylindrical member, and said operating means has a coil.

7. An air suspension comprising:
a shock absorber having a cylinder and a piston rod;
a first housing fixed to said piston rod of the shock absorber;
an elastic body disposed to form a main air chamber in cooperation with said first housing, one end of the elastic body being fixed to said first housing and the other end to said cylinder through an air piston;
a second housing disposed to form an auxiliary air chamber outside said main chamber;
a valve unit capable of affording and shutting off communication between said main and auxiliary air chambers and disposed in said auxiliary air chamber, said valve unit having a cylindrical member and a valve body formed of a magnetic material capable of moving along said cylindrical member; and
a pair of coils for operating the valve unit.

8. An air suspension comprising:
a shock absorber;
a main air chamber formed by a first housing and a diaphragm to surround the shock absorber;
an auxiliary air chamber having a substantially constant volume formed by said first housing and a second housing to communicate to said main air chamber and released from a spring action when shut off from the main air chamber;
a valve unit capable of affording and shutting off communication between said main and auxiliary air chambers; and
a means for operating the valve unit,
wherein said valve unit and the means are disposed respectively in said auxiliary air chamber, and the means is operated from the outside.

9. An air suspension as claimed in claim 1 wherein said valve unit has a cylindrical member and a valve body formed of a magnetic material capable of moving along said cylindrical member, and said operating means has a coil.

* * * * *